Figure 1:
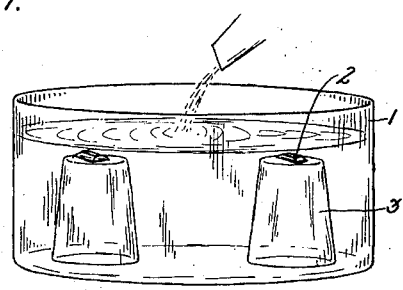

A. McL. NICOLSON.
METHOD OF MAKING PIEZO ELECTRICAL CRYSTALS.
APPLICATION FILED APR. 2, 1918.

1,414,870.

Patented May 2, 1922.

Inventor:
Alexander M. Nicolson
by J. G. Roberts  Att'y.

UNITED STATES PATENT OFFICE.

ALEXANDER McLEAN NICOLSON, OF NEW YORK, N. Y., ASSIGNOR TO WESTERN ELECTRIC COMPANY, INCORPORATED, OF NEW YORK, N. Y., A CORPORATION OF NEW YORK.

METHOD OF MAKING PIEZO-ELECTRICAL CRYSTALS.

1,414,370.      Specification of Letters Patent.      Patented May 2, 1922.

Application filed April 2, 1918. Serial No. 226,343.

*To all whom it may concern:*

Be it known that I, ALEXANDER McLEAN NICOLSON, a subject of the King of Great Britain, residing at New York, in the county of New York and State of New York, have invented certain new and useful Improvements in Methods of Making Piezo-Electrical Crystals, of which the following is a full, clear, concise, and exact description.

As indicated in the Handbuch der Physik, Vol. IV, p. 774, 1905, piezo-electricity by F. Pockels, it was recognized as early as 1880 by J. and P. Curie that on subjecting the opposite sides of certain crystals to pressure a difference in electrical potential at certain sides of the crystal is produced. This difference in potential was relatively small and was determined by a suitable measuring instrument. The early investigators in the field of piezo-electricity or pressure-electricity experimented with different kinds of crystals in order to determine in what substances this effect was most pronounced. Their experiments led them to the conclusion that this effect of generating electricity by a difference in mechanical pressure was most marked in a crystal of the substance commonly known as sodium potassium tartrate. It has been discovered that piezo-electrical crystals and especially those of sodium potassium tartrate are admirably adapted for use in telephone transmitters and receivers, repeaters, loud speakers, modulators of radio frequency currents and the like. It has been discovered that piezo-electrical crystals may be used to particular advantage in submarine signaling between friendly boats or for the detection of hostile submarines. It has also been discovered that these crystals when placed on the ground or on some object in contact with the ground, such as a rock, tree or the like, are extremely sensitive to an earth tremor caused, for instance, by a person walking in the proximity of these crystals. This latter use of these crystals is of particular advantage in trench warfare.

The above and other uses for piezo-electrical crystals are described and claimed in the following copending application or in divisions thereof to be later filed: Serial No. 227,802, filed April 10, 1918, by A. M. Nicolson, entitled Piezophony.

The present invention has to do with a method of growing piezo-electrical crystals and an object of the invention is to grow crystals in which the piezo-electrical effect is many times stronger than in crystals produced by previous methods.

This object is accomplished by growing crystals that are single, homogeneous and large, often weighing as much as one pound, the crystals attaining a size of about four inches long, two inches wide and one-half inch thick. After the crystal is grown it is subjected to a curing process which increases its piezo-electrical properties.

In making a crystal according to the present invention, a warm concentrated solution, in water, of sodium potassium tartrate is prepared. This solution should be fairly concentrated at a temperature of about 100° F. and into the solution of about that temperature is dropped a small crystal of sodium potassium tartrate, perhaps one-half inch long and one-eighth of an inch wide and thick. This small crystal or seedling may be obtained in the usual way by crystallization and should be warm when dropped into the solution. The crystal should be placed into the solution so as to lie flat in the containing vessel. The vessel is then heat insulated by wrapping with paper, covering with hair felt or by doing either of the former in addition to placing the container in a fireless cooker. In this way the solution cools very slowly and the increase in concentration due to cooling effects a building up of the seedling which, in the course of ten hours to one thousand hours, will attain the required size.

A further object of the invention is to grow a crystal which while large, is comparatively thin, it having been determined that the piezo-electrical effect is usually greater the thinner the crystal.

The above object is accomplished by taking advantage of the fact that with a given height of salt solution, the concentration is greater at the bottom of the container than at the top. In line with the above object, a crystal is grown not on the bottom of the container, but on a platform which elevates the crystal above the bottom of the vessel. Then the tendency for a crystal to grow laterally is much stronger than for it to grow in the direction of the weaker solution above it, and a thin crystal is obtained.

In order to increase the piezo-electrical effect of the crystals their waters of inclusion are removed, and this may be done in the following way. The crystal, after removal from the solution, is desiccated with a drying agent such as calcium chloride for about two or three hours. The crystal is then submerged in alcohol. The alcohol and crystal should be brought to approximately the same temperature before submerging the crystal so as to avoid cracking the same. The crystal is allowed to remain in alcohol for about twenty-four hours. After the crystal has remained for some time in the alcohol it will be found that vermiform extrusions have emerged from the crystal. It seems probable that due to osmosis the waters of inclusion have been replaced by the alcohol which, however, is subsequently wholly or partially removed in the drying process.

The crystal is removed from the alcohol and baked at a temperature of about 105° F. for about twelve hours, when the crystal will be no longer clear in appearance but will be cloudy or opalescent and the surface of the crystal will show irregular white spots.

A crystal prepared as indicated above will have a high electrical resistance of the order of several hundred thousand ohms when taken from the oven, but this value increases in the course of a day or so to a value of several megohms.

In order to protect the crystals from moisture they are provided with a waterproof coating, for instance, of the material sold under the name of "Ambroid." It has been discovered that this moistureproofing stabilizes the electrical resistance as well as the natural frequencies of the crystal, which would not be the case if the moisture content of the crystal were permitted to change either by the crystal's losing its water of inclusion or alcohol, by evaporation, or by the crystal's absorption of moisture from the atmosphere or elsewhere.

Figure 2:
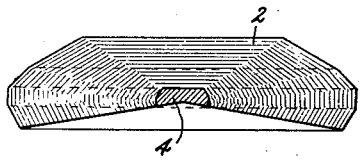
Figure 3:
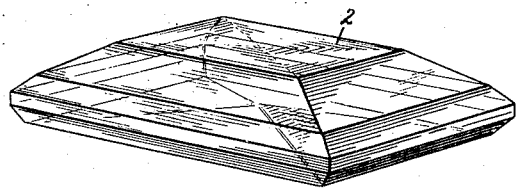

Referring to the drawing, Fig. 1 shows a container of salt solution, the crystal growing on the bottom of an upturned glass; Figs. 2 and 3 show respectively a cross section and a perspective view of a crystal grown according to the present invention; and Fig. 4 illustrates a crystal provided with electrical connections and suitable for use as a telephone transmitter or receiver, etc.

Referring to Fig. 1, a concentrated salt solution is provided in the vessel 1, the crystal 2 growing on an elevated platform such as the bottom of the upturned glass 3.

The seedling is discernible after the crystal is full-grown, as illustrated at 4 in Fig. 2. If the crystal were grown in an upright position instead of as shown in Fig. 1, the crystal would be symmetrical about a horizontal axis in Fig. 2. A thinner crystal may be grown by laying them flat as shown in Fig. 1, and a thin crystal is desirable as pointed out above. When grown according to the improved process the bottom of the crystal is usually slightly reentrant, as shown in Fig. 2.

Figure 4:
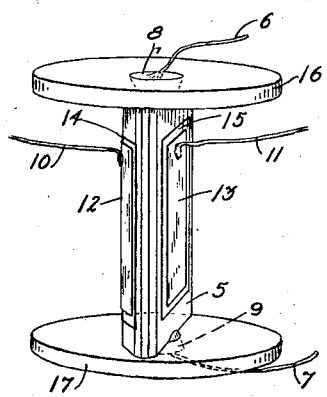

In Fig. 4 the crystal is provided with a moisture-proofing of ambroid, wax or the like, and conductors 6 and 7 are soldered to the ends of the crystal by means of lugs 8 and 9 of Wood's metal which has a melting point about the same as that of the crystal. Conductors 10 and 11 are fastened to tinfoil sheets 12 and 13 respectively on opposite sides of the crystal. Between the tin-foil sheets 12, 13 and the crystal are sheets of mica 14 and 15, the mica being fastened to the crystal, and the tin-foil to the mica by means of ambroid or other cement. The mica increases the dielectric strength of the crystal. This mica or other dielectric may be employed on only one side of the crystal if desired. The lugs 8 and 9 are surrounded by discs of anhydrous sodium potassium tartrate 16 and 17 which provide standards or bases for the crystal.

It has been discovered that if a source of sound strikes the crystal of Fig. 4, an electric current will be produced which, if supplied to a receiver such as a similarly constructed crystal, will cause a faithful reproduction of the sound to be produced even in the case of sound caused by the human voice or music.

It is impossible to predetermine between which two of the conductors 6, 7, 10, 11 the greatest effect will be produced, and this should be determined by trial. In general, in about twenty-five per cent of the cases, the best results will be obtained by a connection from conductor 10 to one of the other three, and in seventy-five per cent of the cases from conductor 11 to one of the other three. In some cases best results are obtained by combining 10 and 11 as one conductor and employing 6 or 7 as the other.

What is claimed is:

1. The method of increasing the piezoelectric effect of a crystal, which consists in removing water of inclusion from said crystal.

2. The method of increasing the piezoelectric effect of a crystal which consists in soaking said crystal in alcohol and in then heating said crystal.

3. The method of preparing a crystal of Rochelle salts which consists in immersing a seedling thereof in a concentrated solution of said salt, in gradually lowering the temperature of the solution, desiccating the resulting crystal, soaking said crystal in alcohol, and in drying said crystal.

4. The method of stabilizing the electrical properties of a piezo-electrical substance which consists in moisture-proofing said substance.

5. The method of growing a thin crystal which consists in supporting said crystal in a horizontal position above the bottom of a vessel containing a concentrated salt solution and restricting the growth of said crystal on one of its sides.

6. The method of growing a thin crystal which consists in supporting said crystal in a horizontal position upon an elevated platform in a concentrated salt solution in such a manner as to present an obstruction to growth underneath the crystal.

7. The method of increasing the piezo-electric effect of a crystal which consists in soaking said crystal in alcohol and in then drying the crystal internally.

8. The method of increasing the piezo-electric effect of a crystal which consists in soaking said crystal in alcohol and in then evaporating liquid from within said crystal.

9. The method of growing a thin crystal which comprises supporting said crystal in a horizontal position above the bottom of a vessel containing a concentrated salt solution and restricting the growth of said crystal on its top and bottom sides.

10. The method of growing a thin crystal which comprises supporting said crystal in a horizontal position above the bottom of a vessel containing a concentrated salt solution in such a manner as to reduce growth under the crystal.

11. The method of growing a crystal which comprises supporting said crystal in a horizontal position above the bottom of a vessel containing a concentrated mother liquor in such a manner as to screen the bottom of the crystal from the action of the mother liquor below it.

12. The method of growing a crystal which comprises supporting said crystal in a horizontal position above the bottom of a vessel containing a concentrated salt solution in such a manner as to prevent contact between the solution and the bottom of the crystal.

13. The method of growing a crystal which comprises supporting said crystal in a horizontal position above the bottom of a vessel containing a concentrated solution of mother liquor and closely adjacent the surface of the mother liquor.

In witness whereof, I hereunto subscribe my name this 28th day of March, A. D. 1918.

ALEXANDER McLEAN NICOLSON.